(12) United States Patent
Ram et al.

(10) Patent No.: US 10,720,704 B2
(45) Date of Patent: Jul. 21, 2020

(54) MOBILE ANTENNA TRACKING

(71) Applicant: Gilat Satellite Networks Ltd., Petah Tikva (IL)

(72) Inventors: Uzi Ram, Givat Elah (IL); Izhar Marinov, Herzelya (IL); Ivan Tsonev Ivanov, Sofia (BG)

(73) Assignee: Gilat Satellite Networks Ltd., Petah Tikva (IL)

(*) Notice: Subject to any disclaimer, the term of this patent is extended or adjusted under 35 U.S.C. 154(b) by 451 days.

(21) Appl. No.: 15/260,481

(22) Filed: Sep. 9, 2016

(65) Prior Publication Data

US 2017/0082754 A1 Mar. 23, 2017

Related U.S. Application Data

(60) Provisional application No. 62/219,910, filed on Sep. 17, 2015.

(51) Int. Cl.
*H01Q 3/00* (2006.01)
*H01Q 3/38* (2006.01)
*H01Q 1/12* (2006.01)
*H01Q 21/00* (2006.01)
*H04B 7/185* (2006.01)
*G01S 19/23* (2010.01)
*H01Q 1/24* (2006.01)

(52) U.S. Cl.
CPC .......... *H01Q 3/385* (2013.01); *H01Q 1/1257* (2013.01); *H01Q 21/00* (2013.01); *G01S 19/23* (2013.01); *H01Q 1/243* (2013.01); *H04B 7/1851* (2013.01); *H04B 7/18515* (2013.01)

(58) Field of Classification Search
CPC ....... G01S 19/23; G01S 19/14; H01Q 1/1257; H01Q 1/243; H01Q 3/385; H01Q 21/00; H04B 7/1851; H04B 7/18515
USPC .................. 342/357.62, 357.52, 372, 377
See application file for complete search history.

(56) References Cited

U.S. PATENT DOCUMENTS 3,824,595 A * 7/1974 Hall ........................ G01S 1/02
  342/384
5,515,058 A * 5/1996 Chaney ................. H01Q 1/1257
  342/359

(Continued)

FOREIGN PATENT DOCUMENTS

WO 2010/135465 A1 11/2010

OTHER PUBLICATIONS

International Search Report and Written Opinion—PCT/IL2016/051015—dated Dec. 19, 2016.

*Primary Examiner* — Chuong P Nguyen
(74) *Attorney, Agent, or Firm* — Banner & Witcoff, Ltd.

(57) ABSTRACT

A mobile terminal, operational both to receive and transmit, may comprise a mobile antenna and an antenna controller that may be configured to control the mobile antenna at least for keeping it pointed towards the satellite, e.g. as the mobile terminal and/or the satellite move. Disclosed is a method that may be used by the antenna controller for optimizing the pointing of the mobile antenna, the method may be based on assessing both the reception quality and the transmission quality. This method may be used for overcoming degradation, mainly to transmission quality, that may result from squints between an optimal reception direction and an optimal transmission direction associated with the mobile antenna.

25 Claims, 3 Drawing Sheets

(56) References Cited

U.S. PATENT DOCUMENTS

| | | | |
|---|---|---|---|
| 6,369,756 B1 * | 4/2002 | Wang | H04B 7/0615 342/367 |
| 6,400,315 B1 | 6/2002 | Adler et al. | |
| 6,417,803 B1 | 7/2002 | de La Chapelle et al. | |
| 6,473,036 B2 * | 10/2002 | Proctor, Jr. | H01Q 1/246 342/372 |
| 6,496,157 B1 * | 12/2002 | Mottier | H01Q 1/246 342/373 |
| 6,580,394 B2 * | 6/2003 | Wang | H04B 7/0615 342/367 |
| 6,661,375 B2 * | 12/2003 | Rickett | H01Q 3/22 342/372 |
| 6,956,526 B1 | 10/2005 | Lundstedt, Jr. et al. | |
| 7,321,636 B2 * | 1/2008 | Harel | H04B 7/0623 375/267 |
| 7,577,464 B2 * | 8/2009 | Ezal | H01Q 1/243 342/149 |
| 7,880,674 B2 * | 2/2011 | Ivanov | G01S 3/42 342/359 |
| 7,956,806 B2 * | 6/2011 | Liu | H04B 7/086 342/359 |
| 7,999,738 B2 * | 8/2011 | Melconian | G01S 3/32 342/427 |
| 8,223,073 B2 * | 7/2012 | Berntsen | H04B 7/086 342/432 |
| 8,730,095 B1 * | 5/2014 | Volman | G01S 3/48 342/147 |
| 9,391,692 B2 * | 7/2016 | Marinov | H04B 7/18517 |
| 10,051,487 B2 * | 8/2018 | Noerpel | H01Q 1/288 |
| 2004/0014429 A1 * | 1/2004 | Guo | H04B 7/0632 455/73 |
| 2006/0211379 A1 * | 9/2006 | Mantha | H01Q 3/00 455/73 |
| 2017/0254903 A1 * | 9/2017 | Johnson | G01S 3/043 |
| 2018/0359647 A1 * | 12/2018 | Noerpel | H04B 7/18519 |

* cited by examiner

MOBILE ANTENNA TRACKING

PRIORITY CLAIM

This application claims priority to U.S. Provisional Patent Application Ser. No. 62/219,910, filed Sep. 17, 2015, and entitled "Mobile Antenna Tracking," the disclosure of which is incorporated by reference herein in its entirety and made part hereof.

FIELD

Aspects of the disclosure pertain to the field of satellite communications using mobile terminals.

BACKGROUND

A mobile terminal for communication via satellite is typically equipped with a mobile antenna that keeps pointing towards the satellite while the terminal is in motion. A controller coupled with the antenna uses one or more devices, for example a GPS receiver, a compass, 3-D gyroscopes and accelerometers, for determining a direction of movement and corrects the antenna alignment in accordance with the determined direction of movement to keep the antenna pointing towards the satellite. However, compasses often suffer from large errors, whereas pointing data from gyroscopes and accelerometers tend to slowly drift. In order to compensate for the drift in pointing data and provide slow correction of the antenna pointing, the antenna controller often uses information related to the reception quality of a received signal, for example any one of Signal to Noise Ratio (SNR), Signal Strength, Receiver Signal Strength Indication (RSSI) and Bit Error Rate (BER).

When the mobile terminal is operational both to receive and transmit, the transmitting (TX) antenna and the receiving (RX) antenna usually share the same reflector. Pointing the shared aperture (reflector) in accordance with a reception SNR at the mobile terminal is usually sufficient for achieving fairly accurate pointing, both for receiving and for transmitting.

However, sometimes the direction of the TX antenna beam has a slight squint in reference to the direction of the RX antenna beam, even when both the TX antenna and the RX antenna share the same reflector. Sometimes, the RX antenna and the TX antenna have independent apertures. For instance, in phased array antennas, the TX antenna and the RX antenna usually have independent apertures and although the two antennas may be installed in parallel and the RX antenna pointing may be used for pointing the TX antenna as well, small inaccuracies lead to some squint between the pointing of the two antennas.

In satellite communications, the transmission frequencies are higher than the reception frequencies. Consequently, where an RX antenna and a TX antenna share a common reflector the TX antenna has a narrower beam compared to the beam of the RX antenna. In order to use SNR readings of a received signal for mobile antenna tracking, the antenna is dithered around the pointing direction in order to estimate a gradient of the pointing error, which can then be used for determining the needed pointing correction. One dithering method includes moving the antenna in accordance with four corners of a square around the current pointing direction (e.g. lower-left, lower-right, higher-right, and higher-left). Another dithering method includes moving the antenna in accordance with a conical scan around the some pointing direction. Typically, this dithering or conical scan follows a −0.5 dB contour of the RX beam (the specific contour selection is a compromise between the need for low antenna gain loss and good antenna dynamics). As the TX antenna has a narrower beam, this dithering or scan corresponds to a more degraded contour (for example, a −1 dB contour) around the TX antenna pointing, causing greater loss in the terminal's TX link, even with no squint at all. When some squint is added, the loss in the terminal's TX link is even larger.

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some aspects of the disclosure in a simplified form as a prelude to the description below.

A satellite communication system may comprise at least a hub, a mobile terminal and a satellite. The mobile terminal may comprise a modem, a mobile antenna, an antenna controller and one or more sensors that may be configured to sense changes in a direction at which the mobile antenna may be pointing. The antenna controller may be configured to receive one or more indications from the modem and/or from the one or more sensors, and to generate one or more control signals towards the mobile antenna for at least the purpose of modifying the direction at which the mobile antenna may be pointing.

According to aspects of the disclosure, the antenna controller may be configured to receive Local-SNR estimations corresponding to reception at the mobile terminal of a signal transmitted by the hub. The antenna controller may further be configured to receive Far-SNR estimations corresponding to reception at the hub of a signal transmitted by the mobile terminal. The Local-SNR estimations may correspond to a reception (RX) pointing quality of the mobile antenna. The Far-SNR estimations may correspond to a transmission (TX) pointing quality of the mobile antenna. In some embodiments, the Far-SNR estimations may be received by the antenna controller from the modem of the mobile terminal. The modem of the mobile terminal may be configured to generate the Far-SNR estimations based on corresponding Far-SNR estimations or based on Far-SNR telemetry data that the hub may be configured to send to the mobile terminal.

According to aspects of the disclosure, the antenna controller may be configured to control the mobile antenna to perform a dithering movement (for example, a 360 degrees conical scan) around a tracked direction. The antenna controller may further be configured to record a plurality of Local-SNR estimations and a plurality of Far-SNR estimations while the dithering movement may be in progress. The antenna controller may further be configured to calculate an RX pointing error corresponding to the Local-SNR estimations. Additionally, or alternatively, the antenna controller may be configured to calculate a TX pointing error corresponding to the Far-SNR estimations. The antenna controller may further be configured to synchronize the calculated TX pointing error with the calculated RX pointing error by accounting for a (satellite path) delay in receiving Far-SNR estimations and calculate a weighted-sum of the RX pointing error and the TX pointing error to produce a calculated combined pointing error.

According to aspects of the disclosure, the antenna controller may be configured to periodically repeat the dithering movement and to calculate a combined pointing error estimation for each dithering cycle, and generate pointing corrections for the mobile antenna based on the combined pointing error estimations while using an averaging loop-filter.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Figure 1:
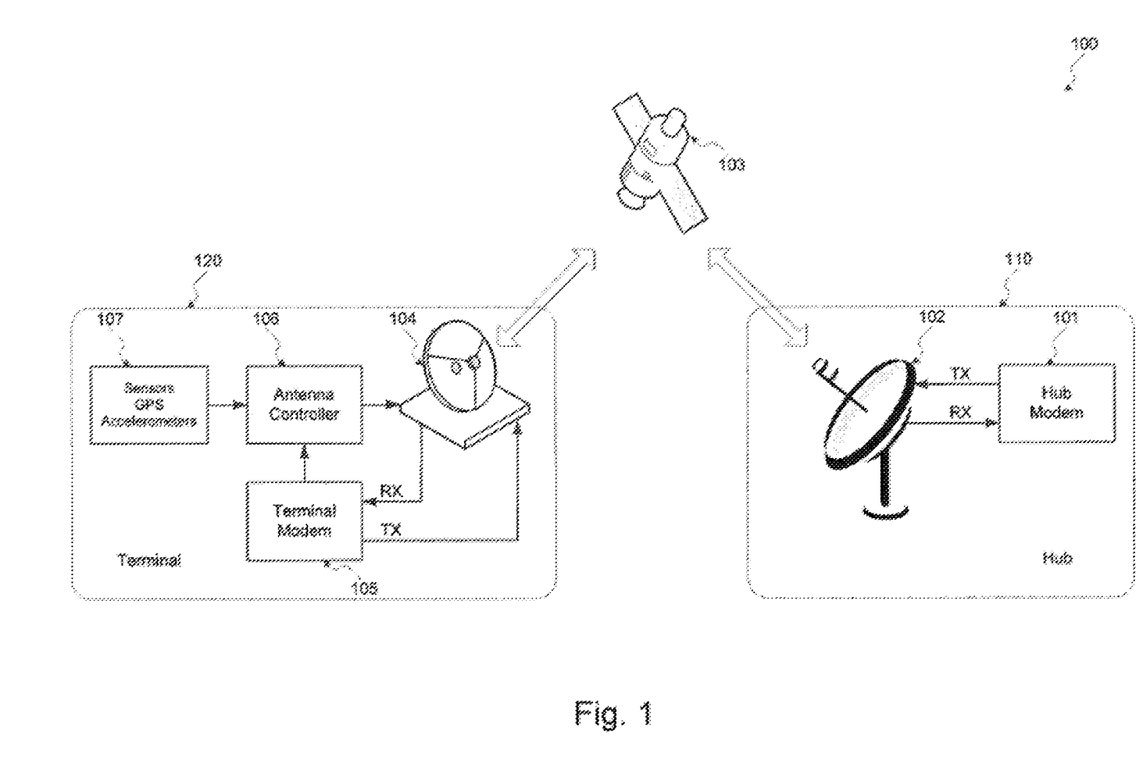
FIG. 1 shows a satellite communication system in accordance with aspects of the disclosure.

In reference to FIG. 1, a satellite communication system 100 may comprise at least a hub 110, a mobile terminal 120 and a satellite 103. In some embodiments, the satellite communication system 100 may comprise a plurality of terminals, wherein at least one terminal of the plurality of terminals may be the mobile terminal 120.

The hub 110 may comprise a hub modem 101 and a hub antenna 102, wherein the hub modem 101 may be coupled to the hub antenna 102. The mobile terminal 120 may comprise a terminal modem 105 and a mobile antenna 104, wherein the terminal modem 105 may be coupled to the mobile antenna 104. The mobile terminal 120 may further comprise an antenna controller 106 and one or more sensors 107, wherein the antenna controller 106 may be coupled to the mobile antenna 104, to the terminal modem 105 and to the one or more sensors 107. The antenna controller 106 may comprise one or more circuits to interface with mobile antenna 104, one or more circuits to interface with terminal modem 105, and one or more circuits to interface with the one or more sensors 107. In some embodiments, the one or more sensors 107 may comprise any of a GPS receiver, one or more gyroscopes, and one or more accelerometers. The antenna controller 106 may be configured to receive one or more indications from any of the terminal modem 105 and the one or more sensors 107, and generate one or more control signals towards the mobile antenna 104. The mobile antenna 104 may be configured to, upon receiving the one or more control signals, change at least one of an azimuth property and an elevation property in accordance with the received one or more control signals. The hub modem 101 may be configured to transmit, e.g. via the hub antenna 102, at least one transmission to the mobile terminal 120. The at least one transmission may be relayed via the satellite 103 to the mobile terminal 120, where it may be received by the terminal modem 105 via the mobile antenna 104.

Figure 2:
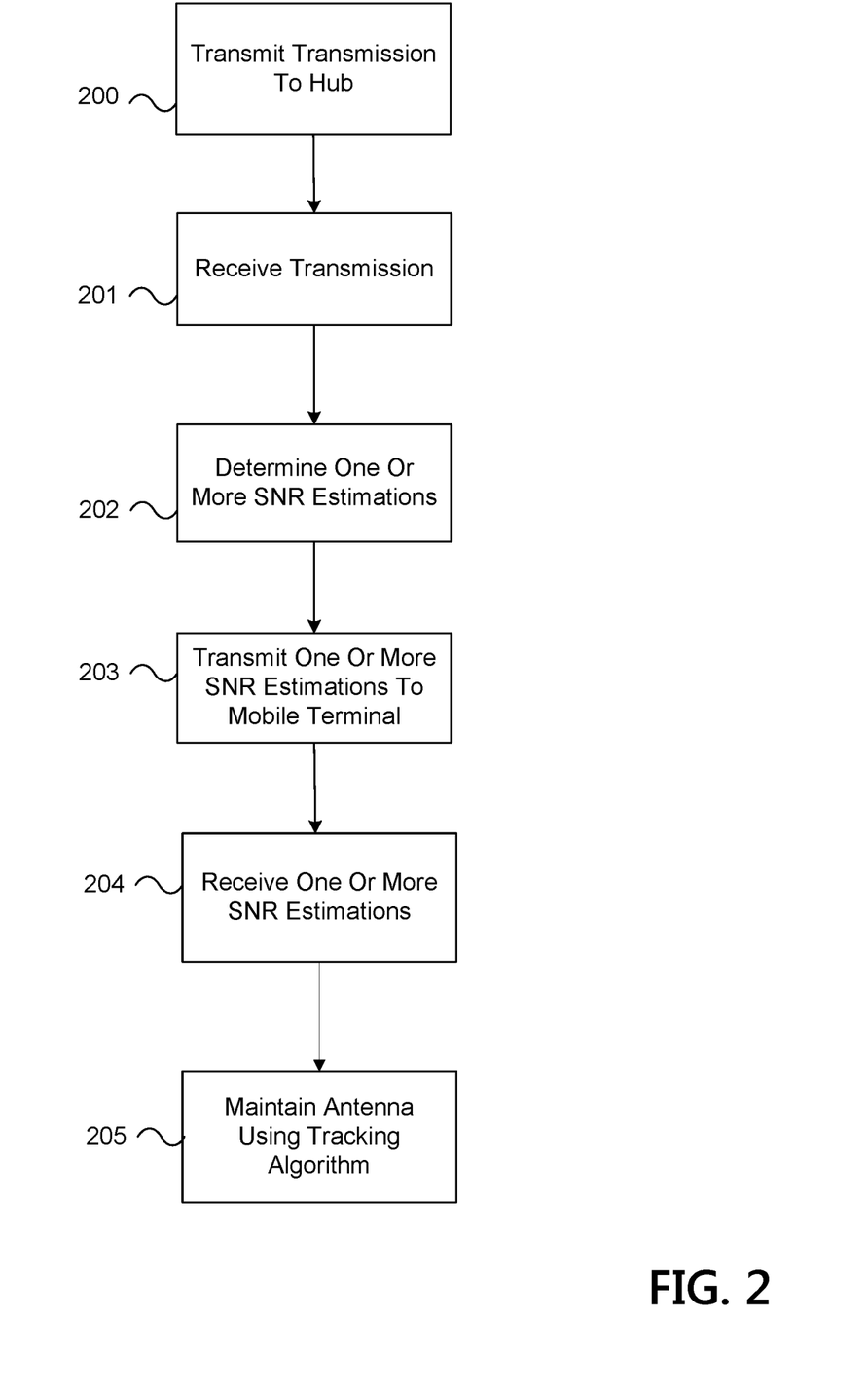
FIG. 2 shows a series of steps performed to maintain an antenna pointing towards a satellite.

FIG. 2 shows a series of steps that may be performed to maintain an antenna pointing towards a satellite. At step 200, the terminal modem 105 of mobile terminal 120 may transmit, via the mobile antenna 104, a transmission to the hub 110. The transmission by the mobile terminal modem 105 may be relayed via the satellite 103 to the hub 110, where it may be received by the hub modem 101 via the hub antenna 102. At step 201, the hub modem 101 may be configured to receive the transmission from the mobile terminal 120. The hum modem 101 may receive the transmission using a receiver that may be included in the hub modem 101.

At step 202, the hub modem 101 may determine a Signal to Noise Ratio (SNR) estimation for the transmission received from the mobile terminal 120. In some embodiments, the hub modem 101 may be configured to determine a plurality of SNR estimations for the transmission received from the terminal 120 in order to determine an SNR estimation for every preconfigured interval (or in accordance with an interval otherwise determined by the hub modem 101). At step 203, the hub modem 101 may send at least one SNR estimation corresponding to the transmission received from the mobile terminal 120. The hub modem 101 may be configured to send the at least one SNR estimation corresponding to the transmission received from the mobile terminal 102 in the at least one transmission that the hub modem 101 may be configured to transmit to the mobile terminal 120. In some embodiments, the hub modem 101 may be configured to send a plurality of SNR estimations corresponding to the transmission received from the mobile terminal 120. The hub modem may be configured to send an SNR estimation of the plurality of SNR estimations immediately or substantially immediately following a determining of the SNR estimation(s).

At step 204, the terminal modem 105 may receive from the hub 110 at least one SNR estimation corresponding to its transmission to the hub. In some embodiments, the terminal modem 105 may be configured to receive a plurality of SNR estimations corresponding to its transmission to the hub 110. The terminal memory 105 may be configured to store, e.g. in a memory associated with the terminal modem 105, one or more SNR estimations of the plurality of SNR estimations. In some embodiments, the terminal modem 105 may be configured to store the one or more SNR estimations corresponding to its transmission to the hub 110 as Far-SNR data.

At step 205, the mobile terminal 120 may keep the mobile antenna 104 pointed towards the satellite 103 by using a tracking algorithm. In some embodiments, the tracking algorithm may be implemented in software that may be executed by one or more processors that may be included in the antenna controller 106. The software, when executed by the one or more processors, may cause the antenna controller 106 to control the pointing of the mobile antenna 104 in accordance with the tracking algorithm. For example, the one or more sensors 107 may be configured to sense a change in a direction at which the mobile antenna 104 may be pointing at. The one or more sensors 107 may indicate the sensed change to the antenna controller 106. The antenna controller 106 may be configured to correct the antenna pointing direction using the tracking algorithm.

Figure 3:
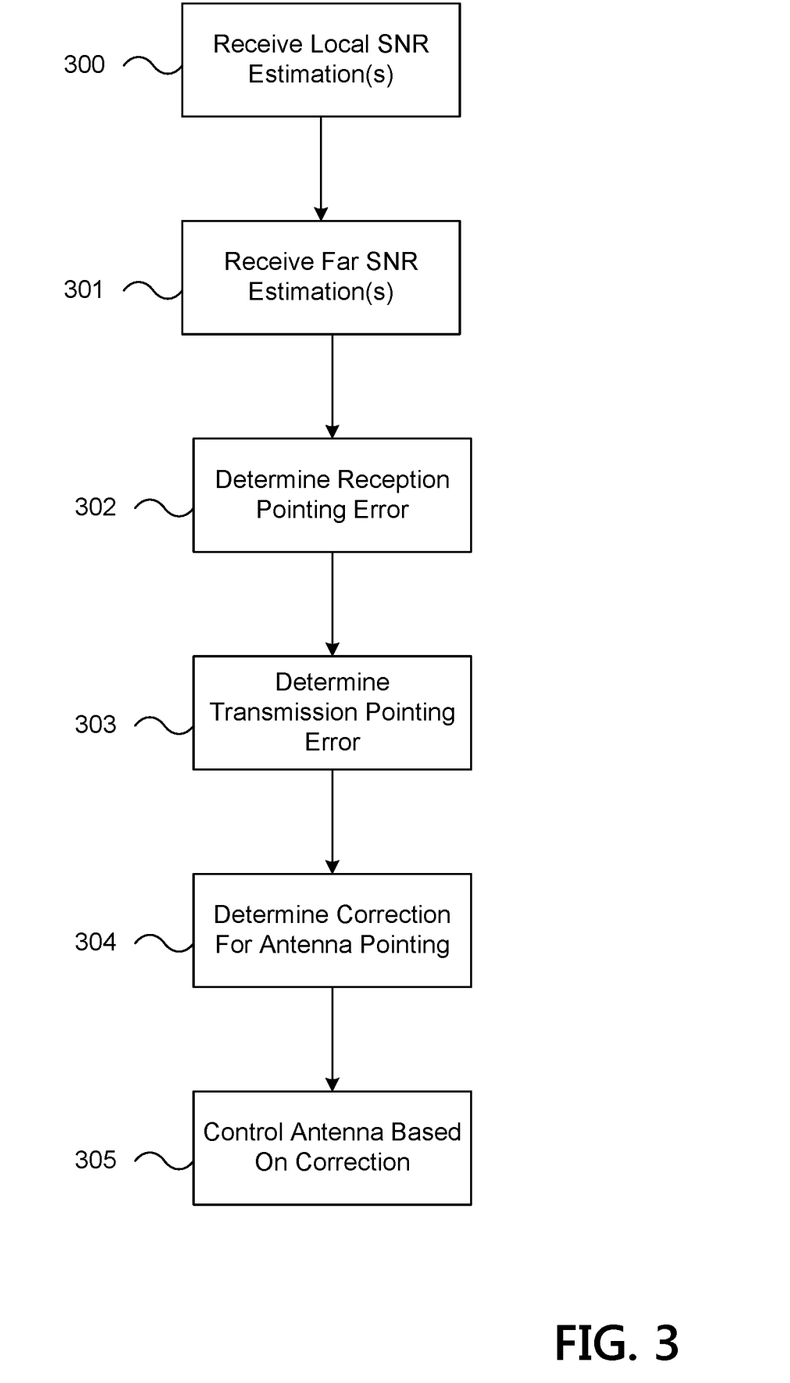
FIG. 3 shows a series of steps performed to correct an antenna pointing direction.

FIG. 3 shows a series of steps that may be executed by the antenna controller to correct the antenna pointing direction using the tracking algorithm. At step 300, the antenna controller 106 may receive, for example from the terminal modem 105, one or more Local-SNR estimations that may correspond to the local reception of mobile terminal 120. The one or more Local-SNR estimations may be based on the reception by mobile terminal 120 of the at least one transmission from the hub 110. In some embodiments, the antenna controller 106 may receive from the terminal modem 105, a plurality of Local-SNR estimations that may correspond to the local reception of mobile terminal 120. The antenna controller 106 may be configured to receive the plurality of SNR estimations at equal intervals.

At step 301, the antenna controller 106 may receive, for example from the terminal modem 105, one or more Far-SNR estimations. The one or more Far-SNR estimations may correspond to the one or more Far-SNR estimations that the terminal modem 105 may receive from the hub 110. At step 302, the antenna controller 106 may determine a reception (RX) pointing error of the mobile antenna 104 based on the one or more Local-SNR estimations (discussed in detail below). At step 303, the antenna controller 106 may determine a transmission (TX) pointing error based on the one or more Far-SNR estimations (discussed in detail below). At step 304, the antenna controller 106 may determine a correction for the antenna pointing based on the estimated RX pointing error and/or the estimated TX pointing error (discussed in detail below). The correction for the antenna pointing may be a correction in azimuth and/or in elevation. At step 305, the antenna controller 106 may control the mobile antenna 104 in accordance with the determined correction for the antenna pointing.

In some embodiments, antenna controller 106 may control the mobile antenna 104 in a manner that may cause the mobile antenna 104 to dither around a current or present pointing direction. In some embodiments, the antenna controller 106 may be configured to control the mobile antenna 104 in a manner that may cause the mobile antenna 104 to perform a conical scan around the mobile antenna's current or present pointing direction. In some embodiments, the antenna controller 106 may be configured to control the mobile antenna 104 to complete a full 360 degrees conical scan in a time interval T (e.g. in seconds). The antenna controller 106 may be further configured to receive from the terminal modem 105 and while the conical scan may be in progress, N Local-SNR estimations and N Far-SNR estimations. The N Local-SNR estimations and N Far-SNR estimations may be evenly spaced along the conical scan interval. For example, the antenna controller 106 may receive one Local-SNR estimation and one Far-SNR estimation every T/N. Each of the N Local-SNR estimations may be received at the antenna controller 106 with delay DLocal, whereas each of the Far-SNR estimations may be received at the antenna controller 106 with delay DFar. The delay DFar may be significantly longer than DLocal due to the round trip latency that may be introduced by the satellite 103 (for example, in case of a geostationary satellite, the round-trip latency may be in the excess of 500 milliseconds).

For sake of simplicity, the descriptions above and/or herein may assume reception of the same number of Local-SNR estimations and Far-SNR estimations while the conical scan may be in progress (e.g. N). However, the method described herein may be easily adjusted to receiving a first number of Local-SNR estimations (e.g. NLocal) and a second number of Far-SNR estimations (e.g. NFar) while the conical search is in progress, wherein the first number may be different from the second number (e.g. NLocal≠NFar). Furthermore, while the description above and/or herein may refer to conical scan as a possible dithering pattern, the methods described herein may be usable also with other dithering patterns.

When the pointing direction that may be associated with a center of the conical scan may comprise some pointing error, arranging a plurality of SNR estimations corresponding to the conical scan in a form of a graph may result in a graph that resembles a sine wave with a single period (cycle). Therefore, a process of determining a maximum SNR estimation among a plurality of SNR estimations corresponding to the conical scan may be equivalent to a process of estimating an unknown phase of single-period sine wave. An unknown phase of a single-period sine wave may be estimated by correlating samples of the single-period sine wave against sine and cosine waveforms of a single period.

The antenna controller 106 may be configured to compute based on the received N Local-SNR estimations, a complex value that may correspond to the RX pointing error based on the following equations:

$$E_{i\_Local} = \frac{1}{N}\sum_{n=0}^{N-1} \cos\left(\frac{2\pi n}{N}\text{Local\_SNR}[n]\right) \qquad \text{Equation 1}$$

$$E_{q\_Local} = \frac{1}{N}\sum_{n=0}^{N-1} \sin\left(\frac{2\pi n}{N}\text{Local\_SNR}[n]\right) \qquad \text{Equation 2}$$

$$E_{Local} = E_{i\_Local} + jE_{q\_Local} \qquad \text{Equation 3}$$

In the above equations, Local_SNR may represent an array (a vector) containing the received N Local-SNR estimations, $E_{i\_Local}$ and $E_{q\_Local}$ may respectively represent a real part and imaginary part of the RX pointing error, and $E_{Local}$ may represent the RX pointing error value.

The antenna controller 106 may be configured to compute based on the received N Far-SNR estimations, a complex value that may correspond to the TX pointing error based on the following equations:

$$E_{i\_Far} = \frac{1}{N}\sum_{n=0}^{N-1} \cos\left(\frac{2\pi n}{N}\text{Far\_SNR}[n]\right) \qquad \text{Equation 4}$$

$$E_{q\_Far} = \frac{1}{N}\sum_{n=0}^{N-1} \sin\left(\frac{2\pi n}{N}\text{Far\_SNR}[n]\right) \qquad \text{Equation 5}$$

$$E_{Far} = E_{i\_Far} + jE_{q\_Far} \qquad \text{Equation 6}$$

In the above equations, Far_SNR may represent an array (a vector) containing the received N Far-SNR estimations, $E_{i\_Far}$ and $E_{q\_Far}$ may respectively represent a real part and imaginary part of the TX pointing error, and $E_{Far}$ may represent the TX pointing error value.

It may be noted that both in the case of the RX pointing error value (e.g. $E_{Local}$) and in the case of the TX pointing error value (e.g. $E_{Far}$), the relevant complex value may correspond to an amplitude (e.g. in dB) and to a phase towards a gradient direction. In some embodiments, the real part of the complex value (e.g. $E_{i\_Local}$ and $E_{i\_Far}$) may correspond to an azimuth direction and the imaginary part of the complex value (e.g. $E_{q\_Local}$ and $E_{q\_Far}$ may correspond to an elevation direction.

However, as previously mentioned, for each pointing direction of the mobile antenna 104 during the conical scan the corresponding Far-SNR estimation may be received at the antenna controller 106 after a delay of $D_{Far}$ and the corresponding Local-SNR estimation may be received at the antenna controller 106 after a delay of $D_{Local}$ (e.g. wherein $D_{Far} > D_{local}$). Therefore, some compensation may be needed for at least the purpose of synchronizing the previously calculated complex values (e.g. $E_{Local}$ and $E_{Far}$) with the antenna pointing direction during the dithering or with the conical scan phase. Given the conical scan duration T (e.g. in seconds), a delay D (e.g. also in seconds) in receiving SNR estimations may result in a phase associated with the relevant complex value (e.g. $E_{Local}$ or $E_{Far}$) being rotated by an angle θ (e.g. in Radian):

$$\theta = -2\pi \frac{D}{T} \qquad \text{Equation 7}$$

The antenna controller 106 may be configured to calculate a corrected TX pointing error value. The antenna controller 106 may calculate the corrected TX pointing error value by back-rotating a phase associated with the TX pointing error value in accordance with the delay associated with receiving Far-SNR estimations (e.g. $D_{Far}$). Additionally, or alternatively, the antenna controller 106 may be configured to calculate a corrected RX pointing error value. The antenna controller may be configured to calculate a corrected RX pointing error value by back-rotating a phase associated with the RX pointing error value in accordance with the delay associated with receiving Local-SNR estimations (e.g. $D_{Local}$). The corrected TX pointing error value and corrected RX pointing error value may be calculated as follows:

$$\theta_{Far} = -2\pi \frac{D_{Far}}{T} \qquad \text{Equation 8}$$

$$E_{Far\_Corrected} = E_{Far} * e^{j\theta_{Far}} \qquad \text{Equation 9}$$

$$\theta_{Local} = -2\pi \frac{D_{Local}}{T} \qquad \text{Equation 10}$$

$$E_{Local\_Corrected} = E_{Local} * e^{j\theta_{Local}} \qquad \text{Equation 11}$$

In the above equations, $D_{Far}$ and $D_{local}$ may respectively represent delays associated with receiving the Far-SNR estimations and Local-SNR estimations, T may represent a conical scan duration, $\theta_{Far}$ and $\theta_{Local}$ may respectively represent phase rotates associated with the TX pointing error value ($E_{Far}$) and the RX pointing error value ($E_{Local}$), and $E_{Far\_Corrected}$ and $E_{Local\_Corrected}$ may respectively represent a phase-corrected TX pointing error value and a phase-corrected RX pointing error value.

In some embodiments, where the delay associated with receiving Local-SNR estimations may be sufficiently short in comparison to the conical scan interval (T), the corresponding correction angle (e.g. $\theta_{Local}$) may be quite small and perhaps lead to a negligible correction (e.g., $e^{j\theta_{Local}} \approx 1$). In such embodiments (for example, when the delay associated with receiving Local-SNR estimations is smaller than a delay threshold value), the corrected RX pointing error value may be set to the same value as the RX pointing error value without performing the corrective rotation calculation (e.g. $E_{Local\_Corrected} = E_{Local}$).

The antenna controller 106 may be configured to, after calculating the corrected RX pointing error value (e.g. $E_{Local\_Corrected}$) and the corrected TX pointing error value (e.g. $E_{Far\_Corrected}$), optimize (i.e. correct) the mobile antenna 104 pointing in accordance with the calculated pointing error values. In some embodiments, the antenna controller 106 may be configured to optimize the mobile antenna 104 pointing only in accordance with reception performance, e.g. by optimizing the mobile antenna 104 pointing only in accordance with the corrected RX pointing error value. In some embodiments, the antenna controller 106 may be configured to optimize the mobile antenna 104 pointing only in accordance with transmission performance, e.g. by optimizing the mobile antenna 104 pointing only in accordance with the corrected TX pointing error value. In some embodiments, for example where the mobile antenna 104 may comprise a single aperture (or reflector), the antenna controller 106 may be configured to optimize the mobile antenna 104 pointing in accordance with both reception performance and transmission performance. The antenna controller 106 may be configured to optimize the mobile antenna pointing by optimizing the mobile antenna 104 pointing in accordance with both the corrected RX pointing error value and the corrected TX pointing error value. The antenna controller 106 may linearly combine the corrected RX pointing error value and the corrected TX pointing error value in order to generate an antenna pointing error value (e.g. E). The antenna controller 106 may control the mobile antenna 104 in accordance with the antenna pointing error value E so that the mobile antenna 104 may be pointed in a direction that may be associated with a compromise between a transmission (TX) only optimization and a reception (RX) only optimization. For example, the antenna controller 106 may be configured to calculate the antenna pointing error value using a predefined or a configurable weight parameter $\alpha$ (e.g. $0 \leq \alpha \leq 1$):

$$E = \alpha E_{Far\_Corrected} + (1-\alpha) E_{Local\_Corrected} \qquad \text{Equation 12}$$

In the above equations, $E_{Far\_Corrected}$ and $E_{Local\_Corrected}$ may respectively represent a phase-corrected TX pointing error value and a phase-corrected RX pointing error value, $\alpha$ may represent a weight parameter, and E may represent an antenna pointing error value.

In some embodiments, the antenna controller 106 may be configured to optimize the mobile antenna 104 pointing in accordance with both reception performance and transmission performance (as previously described) when both Far-SNR estimations and Local-SNR estimations are received from the terminal modem 105, and to optimize the mobile antenna 104 pointing only in accordance with reception performance when only Local-SNR estimations are received (i.e. when Far-SNR estimations are not available). In a first example, Far-SNR estimations might not be available when the mobile terminal 120 may not be allowed to transmit (e.g. following a powering up of the mobile terminal and for as long as the mobile antenna 104 is not pointing (e.g. with sufficient accuracy) towards the satellite 103). In a second example, Far-SNR estimations might not be available if for any reason the transmission from mobile terminal 120 is not received by the hub 110 (e.g. as the Far-SNR estimations may also indicate whether a receiver, which may be included in the hub modem 101, is locked on the mobile terminal's transmission).

The antenna controller 106 may be configured to periodically repeat the conical scan process described above. The antenna control 106 may periodically repeat the conical scan process for as long as the mobile terminal 120 may be operative, such that the mobile antenna 104 is kept on track during the duration of the operation of the mobile terminal 120. However, the delay for obtaining Far-SNR estimations may also determine an interval between a time of completing a conical scan and a time at which a next conical scan may start. In order to obtain Far-SNR estimations that may be relevant to an updated mobile antenna pointing, a next conical scan may not be started for a duration of at least $D_{Far}$ since the mobile antenna 104 pointing may have been updated.

In some embodiments, the antenna controller 106 may be configured to, after completing a conical scan, update the mobile antenna 104 pointing and/or a center for a next conical scan in accordance with a direction that may be indicated by the antenna pointing error value (E) calculated during the completed conical scan. In some embodiments, the antenna controller 106 may be configured to determine an updated mobile antenna pointing and/or an updated center for a next conical scan by using an optimal pointing that may be suggested by the antenna pointing error value (E). In some embodiments, the antenna controller 106 may be configured to determine an updated mobile antenna pointing and/or an updated center for a next conical scan using an averaging loop-filter. For example, the loop-filter may be configured in accordance with an averaging parameter as follows:

$$Az(n+1)=Az(n)+K*\text{Real}(E) \quad \text{Equation 13}$$

$$El(n+1)=El(n)+K*\text{Image}(E) \quad \text{Equation 14}$$

In equations 13 and 14, E may correspond to the antenna pointing error value, Az may correspond to the antenna azimuth, El may correspond to the antenna elevation, Real may be a function that returns the real part of a complex value, Image may be a function returning the imaginary part of a complex value, K may represent the averaging parameter, n may represent a current step and n+1 may represent a next step. In some embodiments, the averaging parameter (e.g. K) may be set to a small fraction for at least the purpose of prolonging the averaging time, wherein the averaging time may be in the excess of T/K and T may represent the conical scan duration.

In some embodiments, the antenna controller 106 may be configured to modify the way the mobile antenna 104 pointing is optimized simply by changing the weight parameter ($\alpha$) that may be used for combining the corrected RX pointing error value and the corrected TX pointing error value in to an antenna pointing error value (e.g. E). The antenna controller 106 may be configured to modify the weight parameter ($\alpha$) in small steps, to determine the effect of each value of the weight parameter ($\alpha$) on the corrected TX pointing error values and/or on the corrected RX pointing error values (e.g. that may be computed for a plurality of conical scans that may be performed for each value of the weight parameter ($\alpha$)), and to determine an optimum value for the weight parameter ($\alpha$) in accordance with one or more criteria.

Various aspects of the disclosure may be embodied as one or more methods, systems, apparatuses (e.g., components of a satellite communication network), and/or computer program products. Accordingly, those aspects may take the form of an entirely hardware embodiment, an entirely software embodiment, an entirely firmware embodiment, or an embodiment combining firmware, software, and/or hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In some embodiments, one or more computer readable media storing instructions may be used. The instructions, when executed, may cause one or more apparatuses to perform one or more acts described herein. The one or more computer readable media may comprise transitory and/or non-transitory media. In addition, various signals representing data or events as described herein may be transferred between a source and a destination in the form of electromagnetic waves traveling through signal-conducting media such as metal wires, optical fibers, and/or wireless transmission media (e.g., air and/or space).

Modifications may be made to the various embodiments described herein by those skilled in the art. For example, each of the elements of the aforementioned embodiments may be utilized alone or in combination or sub-combination with elements of the other embodiments. It will also be appreciated and understood that modifications may be made without departing from the true spirit and scope of the present disclosure. The description is thus to be regarded as illustrative instead of restrictive on the present disclosure.

What is claimed is:

1. A method comprising:
generating, by at least one or more processors of an antenna controller of a terminal, one or more control signals towards an antenna of the terminal, the one or more control signals being configured to cause the antenna to perform a dithering movement around a first pointing direction, wherein the terminal is configured for communication via a satellite;
receiving, by at least the one or more processors of the antenna controller and while the antenna performs the dithering movement, a first plurality of signal to noise ratio (SNR) estimations corresponding to reception of a first signal via the antenna;
receiving, by at least the one or more processors of the antenna controller and while the antenna performs the dithering movement, a second plurality of SNR estimations corresponding to reception of a second signal, wherein the second signal is transmitted via the antenna and the SNR estimations of the second plurality of SNR estimations are received using the first signal;
calculating, by the one or more processors of the antenna controller, a reception pointing error value using the first plurality of SNR estimations;
calculating, by the one or more processors of the antenna controller, a transmission pointing error value using the second plurality of SNR estimations;
determining, by the one or more processors of the antenna controller, a second pointing direction for the antenna in accordance with the first pointing direction, the reception pointing error value, and the transmission pointing error value; and
generating, by at least the one or more processors of the antenna controller, one or more additional control signals towards the antenna, the one or more additional control signals configured to cause the antenna to modify the direction at which the antenna is pointing in accordance with the second pointing direction.

2. The method of claim 1, wherein the calculating a reception pointing error value comprises:
calculating a temporary reception pointing error value using the first plurality of SNR estimations;
determining a first delay associated with receiving the first plurality of SNR estimations; and
back-rotating a phase of the temporary reception pointing error value in accordance with the first delay to produce the reception pointing error value.

3. The method of claim 2, further comprising:
determining whether the first delay is shorter than a threshold delay value; and
calculating the reception pointing error value to be the same as the temporary reception pointing error value responsive to a determination that the first delay is shorter than the threshold delay value.

4. The method of claim 1, wherein the calculating a transmission pointing error value comprises:
calculating a temporary transmission pointing error value using the second plurality of SNR estimations;
determining a second delay associated with receiving the second plurality of SNR estimations; and back-rotating a phase of the temporary transmission pointing error value in accordance with the second delay to produce the transmission pointing error value.

5. The method of claim 1, wherein the determining a second pointing direction for the antenna comprises:
calculating a weighted pointing error value by linearly combining the reception pointing error value and the transmission pointing error value; and
determining the second pointing direction for the antenna further in accordance with the weighted pointing error value.

6. The method of claim 5, wherein calculating the weighted pointing error value by linearly combining the reception pointing error value and the transmission pointing error value comprises use of a weight parameter $\alpha$, wherein $0 \le \alpha \le 1$.

7. The method of claim 6, wherein the value of the weight parameter $\alpha$ is determined in accordance with a compromise between reception only optimization and transmission only optimization.

8. The method of claim 5, further comprising:
determining that the transmission pointing error value cannot be calculated; and
calculating the weighted pointing error value in accordance with the reception pointing error value.

9. The method of claim 5, wherein determining the second pointing direction for the antenna in accordance with the first pointing direction and in accordance with the weighted pointing error value further comprises use of an averaging loop-filter.

10. The method of claim 1, wherein the first plurality of SNR estimations and the second plurality of SNR estimations each comprise the same number of SNR estimations.

11. The method of claim 1, wherein the generating the control signals towards the antenna comprises generating control signals configured to cause the antenna to perform a 360 degrees conical scan around the first pointing direction.

12. The method of claim 1, wherein the receiving the first plurality of SNR estimations or the second plurality of SNR estimations comprises receiving SNR estimations of the first plurality of SNR estimations or of the second plurality of SNR estimations at even intervals.

13. The method of claim 1, wherein the reception pointing error value and the transmission pointing error value are complex values, and calculating one or more of the reception pointing error value or the transmission pointing error value comprises correlating the first plurality of SNR estimations or the second plurality of SNR estimations, respectively, against sine and cosine waveforms of a single period.

14. The method of claim 13, wherein
a real part of the reception pointing vector corresponds to an azimuth direction of the antenna for reception,
an imaginary part of the reception pointing vector corresponds to an elevation direction of the antenna for reception,
a real part of the transmission pointing vector corresponds to an azimuth direction of the antenna for transmission; and
an imaginary part of the transmission pointing vector corresponds to an elevation direction of the antenna for transmission.

15. An apparatus comprising:
one or more circuits configured for interfacing with an antenna;
one or more circuits configured for interfacing with a modem; and
at least one processor coupled to a memory storing executable instructions, which when executed cause the apparatus to:
generate one or more control signals towards the antenna to cause the antenna to perform a dithering movement around a first pointing direction;
receive, from the modem and while the antenna performs the dithering movement, a first plurality of signal to noise ratio (SNR) estimations corresponding to reception of a first signal via the antenna;
receive, from the modem and while the antenna performs the dithering movement, a second plurality of SNR estimations corresponding to reception of a second signal, wherein the second signal is transmitted via the antenna and the SNR estimations of the second plurality of SNR estimations are received using the first signal;
calculate a reception pointing error value using the first plurality of SNR estimations;
calculate a transmission pointing error value using the second plurality of SNR estimations;
determine a second pointing direction for the antenna in accordance with the first pointing direction, the reception pointing error value, and the transmission pointing error value; and
generate one or more additional control signals towards the antenna to cause the antenna to modify the direction at which the antenna is pointing in accordance with the second pointing direction.

16. The apparatus of claim 15, wherein the at least one processor, when executing the executable instructions, causes the apparatus to:
calculate a temporary reception pointing error value using the first plurality of SNR estimations;
determine a first delay associated with receiving the first plurality of SNR estimations; and
back-rotate a phase of the temporary reception pointing error value in accordance with the first delay to produce the reception pointing error value.

17. The apparatus of claim 15, wherein the at least one processor, when executing the executable instructions, causes the apparatus to:
calculate a temporary transmission pointing error value using the second plurality of SNR estimations;
determine a second delay associated with receiving the second plurality of SNR estimations; and
back-rotate a phase of the temporary transmission pointing error value in accordance with the second delay to produce the transmission pointing error value.

18. The apparatus of claim 15, wherein the at least one processor, when executing the executable instructions, causes the apparatus to:
calculate a weighted pointing error value by linearly combining the reception pointing error value and the transmission pointing error value; and
determine the second pointing direction for the antenna further in accordance with the weighted pointing error value.

19. The apparatus of claim 18, further configured to:
determine that the transmission pointing error value cannot be calculated; and
calculate the weighted pointing error value in accordance with the reception pointing error value.

20. The apparatus of claim 18, wherein the weighted pointing error value is calculated using a weight parameter $\alpha$ ($0 \le \alpha \le 1$) and wherein the value of the weight parameter $\alpha$ is determined in accordance with a compromise between reception only optimization and transmission only optimization.

21. The apparatus of claim 15, wherein the second pointing direction for the antenna is determined using an averaging loop-filter.

22. The apparatus of claim 15, wherein the first plurality of SNR estimations and the second plurality of SNR estimations each comprises the same number of SNR estimations.

23. The apparatus of claim 15, wherein the control signals generated towards the antenna cause the antenna to perform a 360 degrees conical scan around the first pointing direction.

24. The apparatus of claim 15, wherein the SNR estimations of the first plurality of SNR estimations or of the second plurality of SNR estimations are received at even intervals.

25. The apparatus of claim 15, wherein one or of the reception pointing error value or the transmission pointing error value are complex numbers and one or more of the reception pointing error value and the transmission pointing error value are calculated by correlating the respective plurality of SNR estimations against sine and cosine waveforms of a single period.

* * * * *